United States Patent [19]

McDowell et al.

[11] 3,920,787

[45] Nov. 18, 1975

[54] JOINT BETWEEN TUBULAR PLASTIC ARTICLES AND METHOD OF FORMING

[75] Inventors: Jon J. McDowell, North Hollywood; James J. Blumenkranz, Hollywood, both of Calif.

[73] Assignee: R & G Sloane Manufacturing Company, Inc., Woodland Hills, Calif.

[22] Filed: Dec. 12, 1973

[21] Appl. No.: 426,681

Related U.S. Application Data

[63] Continuation of Ser. No. 159,334, July 2, 1971, abandoned.

[52] U.S. Cl. ................. 264/263; 285/21; 285/297
[51] Int. Cl.² ........................................ F16L 47/02
[58] Field of Search ............... 277/72 FM; 425/812; 264/262, 263, 249; 285/284, 294, 297, 230, 232, 234, 237, 288, 295, 296, 369, 374, 291, 400, 423, 21, DIG. 16, 337

[56] References Cited

UNITED STATES PATENTS

| | | | |
|---|---|---|---|
| 615,149 | 11/1898 | Farley | 285/294 |
| 2,182,671 | 12/1939 | Lowe et al. | 285/21 |
| 2,573,366 | 10/1951 | Scholl | 285/292 |

FOREIGN PATENTS OR APPLICATIONS

| | | | |
|---|---|---|---|
| 483,904 | 4/1938 | United Kingdom | 285/297 |
| 219,360 | 1/1962 | Austria | 285/21 |
| 1,078,580 | 5/1954 | France | 285/297 |
| 369,924 | 2/1923 | Germany | 285/297 |
| 17,760 | 1910 | United Kingdom | 285/297 |
| 1,407,436 | 6/1965 | France | 285/21 |

*Primary Examiner*—Thomas F. Callaghan
*Attorney, Agent, or Firm*—Finnegan, Henderson, Farabow & Garrett

[57] ABSTRACT

A joint between tubular plastic articles and a method of forming same, wherein a first tubular article has a socket in one end thereof with an outer portion and a reduced inner portion, and an injection hole is provided in the first article and extends into the outer socket portion. The end portion of the second article is positioned in the socket in slidable engagement with the inner socket portion, the end portion of the second article having an outer diameter that is less than the diameter of the outer socket portion so as to define an annular space therebetween in communication with the injection hole. An annular sealing member having a vent hole therethrough is positioned in engagement with the one end of the first article and the adjacent portion of the second article to seal the annular space between the articles, the vent hole being circumferentially spaced from the injection hole. Thereafter, a substantially nonshrink liquid adhesive curable to a solid is injected through the injection hole to fill the annular space and form a leak-proof joint between the first and second articles.

4 Claims, 2 Drawing Figures

INVENTORS
JAMES J. BLUMENKRANZ
JON J. McDOWELL

BY Martha L. Ross

AGENT

JOINT BETWEEN TUBULAR PLASTIC ARTICLES AND METHOD OF FORMING

This is a continuation of application Ser. No. 159,334, filed July 2, 1971 and now abandoned.

BACKGROUND OF THE INVENTION

This invention relates generally to a joint between plastic tubular articles and, more particularly, to such a joint wherein a substantially nonshrink adhesive is injected between the articles to form a leak-proof joint therebetween.

In the formation of joints between plastic tubular articles, such as a plastic pipe and fittings, by solvent welding or by fusion welding, it is very important that the outer diameter of plastic pipe and the inner diameter of the sockets of plastic fittings adapted to receive the pipe therein be held to close tolerances to insure the formation of a leak-proof joint therebetween. In the case of solvent welding, it is particularly important that the pipe and fittings be closely mated, especially in larger diameter sizes, since solvent cements commonly used for solvent welding plastic pipe and fittings contain a large percentage of volatile solvents and thus shrink a great amount upon drying. Accordingly, if there is too large a clearance between a pipe and overlapped fitting, the shrinkage of the solvent cement therebetween will prevent the formation of a leak-proof joint, and thus the joint will be subject to leakage. The manufacture of plastic pipe and fittings to such very close tolerances has required difficult and expensive manufacturing operations and techniques.

SUMMARY OF THE INVENTION

The joint and joint-forming method of the present invention do not require the formation of plastic articles such as pipe and fittings to very close tolerances, as required in the case of the presently used solvent welded and fusion welded joints. In the joint and method of the present invention, a leak-proof joint can be easily formed between plastic articles such as pipe and fittings without requiring close tolerances.

In accordance with the present invention, a first tubular article has a socket in one end thereof having an outer portion and a reduced inner portion, and an injection hole is provided in the first article extending into the outer socket portion. The end portion of a second article is positioned in the socket of the first article in slidable engagement with the inner socket portion, the end portion of the second article having an outer diameter that is less than the diameter of the outer socket portion so as to define an annular space therebetween in communication with the injection hole. An annular sealing member having a vent hole therethrough is positioned in engagement with the one end of the first article and the adjacent portion of the second article to seal the annular space between the articles, the vent hole being circumferentially spaced from the injection hole. Thereafter a liquid adhesive curable to a solid without substantial concomitant shrinkage is injected through the injection hole to fill the annular space between the articles and form a leakproof joint therebetween.

Preferably, the inner socket of the first article is tapered inwardly in a direction away from the outer socket portion thereof to provide for tight engagement with the end portion of the second article to prevent leakage therebetween. Also, the vent hole preferably is circumferentially spaced at an angle of approximately 180° from the injection hole so as to facilitate the venting of air from the annular space between the articles as the adhesive is injected therein. An example of a suitable adhesive is a liquid prepolymer curable to a solid such as an epoxy cement.

DESCRIPTION OF THE PREFERRED EMBODIMENT

Figure 1:
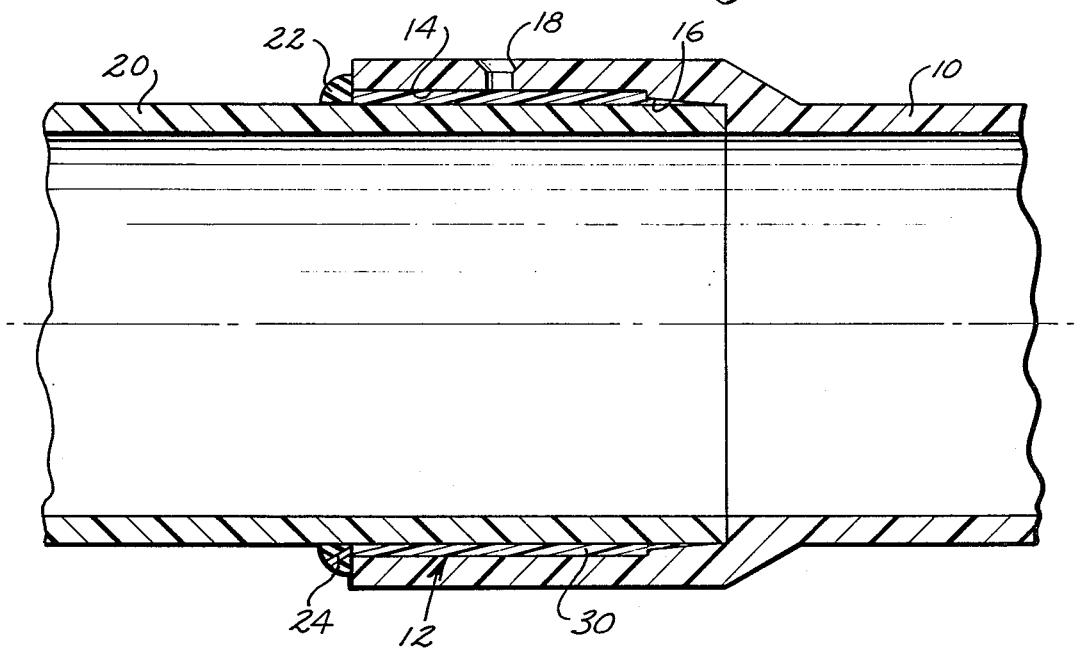
FIG. 1 is a side elevational view in section of a joint formed in accordance with the principles of the present invention.
Figure 2:
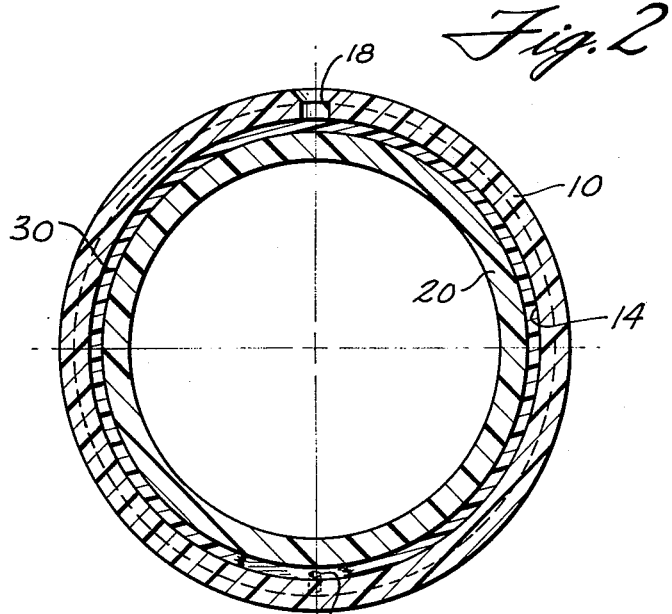
FIG. 2 is a sectional view taken substantially along line 2—2 of FIG. 1.

As shown in FIGS. 1 and 2, a first tubular article, such as a plastic pipe or fitting 10 of any suitable material is provided with an enlarged end portion having a socket 12 therein. The socket 12 comprises an outer portion 14 and an inner reduced portion 16 which tapers inwardly in a direction away from the outer portion 14. The fitting 10 is provided with an injection hole 18 extending into the outer socket portion 14.

A second tubular article, such as a pipe 20, formed of any suitable plastic material which may be the same as or different from that of the fitting 10, is positioned within the socket 12 of the fitting 10. The inner end of the pipe 20 is in tight engagement with the tapered inner socket portion 16 for the purpose of preventing leakage therebetween. The end portion of the pipe 20 has an outer diameter that is less than the diameter of the outer socket portion 14 of the fitting 10 to define an annular space therebetween in communication with the injection hole 18.

In the formation of the joint between the fitting 10 and the pipe 20, an annular sealing member 22, formed of any suitable flexible and resilient material, is positioned in engagement with the outer end of the fitting 10 and the adjacent outer surface of the pipe 20 for the purpose of sealing the annular space between the pipe and the fitting. Preferably, the sealing member 22 is provided with a vent hole 24 that is circumferentially spaced from the injection hole 18. The vent hole 24 preferably is spaced at an angle of approximately 180° from the injection hole 18.

Thereafter, an adhesive 30 is injected through the injection hole 18 to fill the annular space between the pipe 20 and the fitting socket 12 to form a leak-proof joint between the pipe and the fitting. The adhesive 30 preferably is a liquid adhesive curable to a solid without substantial concomitant shrinkage. While different types of adhesives may be used within the scope of the present invention, specific examples of suitable adhesives are liquid prepolymers, such as epoxy cement, polyester, or polyurethane. Since the adhesive 30 fills the annular space between the pipe 20 and the fitting socket 12, and the adhesive is of the prepolymer type such that it undergoes a nonshrink polymerization cure, a leak-proof joint is formed between the pipe and the fitting, regardless of the amount of clearance therebetween.

It will be readily seen that, through the use of the joint and method of the present invention, it is possible to form leak-proof joints between tubular articles such as plastic pipe and fittings without requiring a close tolerance fit between the pipe and fittings. In this manner, effective joints may be formed between pipe and fittings without requiring the difficulty and expense of manufacturing operations required for manufacturing plastic pipe and fittings to close tolerances.

What is claimed is:

1. In a method of joining plastic tubular articles wherein a first tubular article has a socket in one end thereof, said socket having an outer portion and a reduced inner portion, an injection hole is provided in said first article and extends into said outer socket portion, and the end portion of a second article is positioned in said socket in slidable engagement with the inner socket portion, the end portion of the second article having an outer diameter that is less than the diameter of said outer socket portion so as to define an annular space therebetween in communication with said injection hole; the improvement comprising: positioning an annular sealing member in axial abutting contact against said one end face of the first article and in contact with the adjacent portion of the second article to seal said annular space between said articles said sealing member having a single, open vent hole therethrough in communication with said annular space, and spacing said single vent hole in circumferentially at an angle approximately 180° from said injection hole, and injecting a substantially nonshrink liquid adhesive curable to a solid through said injection hole to fill said annular space and form a leak-proof joint between said first and second articles, said vent hole venting air from the annular space as the adhesive is injected therein.

2. The method of claim 1 wherein the inner socket portion is tapered inwardly in a direction away from said outer socket portion to provide for tight engagement with the end portion of said second article to prevent leakage therebetween.

3. The method of claim 1 wherein said adhesive is a liquid prepolymer.

4. The method of claim 3 wherein said adhesive is an epoxy cement.

* * * * *

UNITED STATES PATENT AND TRADEMARK OFFICE
CERTIFICATE OF CORRECTION

PATENT NO. : 3,920,787
DATED : November 18, 1975
INVENTOR(S) : Jon J. McDowell and James J. Blumenkranz It is certified that error appears in the above—identified patent and that said Letters Patent are hereby corrected as shown below:

Claim 1, column 4, line 4, delete "in" which appears before "circumferentially".

Signed and Sealed this twenty-fourth Day of February 1976

[SEAL]

Attest:

RUTH C. MASON
Attesting Officer

C. MARSHALL DANN
Commissioner of Patents and Trademarks